United States Patent [19]

Burbury

[11] 4,449,228

[45] May 15, 1984

[54] COLLIMATOR LOGIC CONTROL SYSTEM

[75] Inventor: Robert L. Burbury, Elgin, Ill.

[73] Assignee: Litton Industrial Products, Inc., Beverly Hills, Calif.

[21] Appl. No.: 363,702

[22] Filed: Mar. 30, 1982

[51] Int. Cl.[3] .......... G03B 41/16

[52] U.S. Cl. .......... 378/151; 378/91

[58] Field of Search .......... 378/151, 91

[56] References Cited

U.S. PATENT DOCUMENTS 3,643,095 2/1972 Shuster .......... 378/151

3,947,689 3/1976 Wagner .......... 378/151

4,137,460 1/1979 Fitzsimmons .......... 378/151

*Primary Examiner*—Craig E. Church

*Attorney, Agent, or Firm*—John M. Haurykiewicz; Walter R. Thiel

[57] ABSTRACT

An improved PBL X-ray system in which the collimator is automatically adjusted so that the X-ray field size at an image receptor conforms to the image receptor size and the X-ray source to image receptor distance. Swivelling of the collimator in a plane parallel to the image receptor is detected and operation of the X-ray source is disabled. Manual operation may be obtained by removing the image receptor from its holder. Swivelling the collimator plus or minus 90° exchanges the normally detected image receptor cross and longitudinal dimensions to automatically realign the collimator and image receptor axis. A PBL time delay is provided to prevent premature and undesired operation of the collimator shutters.

10 Claims, 4 Drawing Figures

COLLIMATOR LOGIC CONTROL SYSTEM

This invention relates to X-ray apparatus, and in particular, to improvements therein for insuring safe and effective operation thereof.

BACKGROUND OF THE INVENTION

Reference may be made to the following U.S. patents of interest: U.S. Pat. Nos. 3,581,094; 3,643,095; 3,764,808; 3,863,073; 3,875,411; 3,936,647; 3,947,689.

In presently available X-ray apparatus, there is provided an image receptor and an adjustable shutter mounted between the X-ray source and the image receptor. In accordance with prescribed health and safety regulations, automatic or semi-automatic means are provided for adjusting the shutter aperture to conform to the image receptor size and the detected distance between the X-ray source and the image receptor. The detected distances may be either a predetermined discrete distance (known as discrete source to image distance or discrete SID) or a continuously monitored distance (known as continuous source to image distance, or continuous SID). Such shutter adjustment operations are required in X-ray apparatus in order to insure that a person being X-rayed will only be exposed to a minimum of useful X-rays. The term "Positive Beam Limitation" or PBL is commonly used in the trade to identify this desired apparatus and/or operation. Thus, in such prior art PBL X-ray apparatus, the shutter aperture is automatically adjusted (and special lighting features may be provided in manual operation) so that the X-ray will only fall on the actual cross-sectional area of an image receptor or X-ray film.

In such apparatus, the dimensions of two rectilinear axes, commonly termed the "longitudinal" and the "cross" axes of the image receptor cassette are normally aligned with the corresponding longitudinal and cross axes of the shutter aperture or collimator. Thus, the shutter aperture along the longitudinal axis as well as the shutter aperture along the cross axis is adjusted in accordance with the detected source to image distance and the detected image receptor size so that the area covered by the X-ray beam is only impinging on the image receptor.

In such prior PBL X-ray apparatus, it has become standard procedure to allow the operator to remove the image receptor cassette from its holder during the X-ray operation for various reasons, such as for patient comfort during X-ray filming, or to enable a more effecient filming procedure. During such a procedure, the operator may then normally swivel or rotate the collimator in a plane parallel to the plane of the image receptor, to align the collimator longitudinal and cross axes with those of the image receptor. It has now been found that such an operation can lead to unwanted exposure of X-rays. This may occur if, for instance, following this procedure the operator does not return the collimator back to the home or non-swivel position. Thus, when the next operator inserts a cassette into the holder, with the collimator in the swivelled position, the longitudinal and cross axes of the collimator and image receptor are now misaligned. Upon activating the X-ray source, the X-rays will undesirably impinge on an area of the patient's body which is not being filmed.

Accordingly, it is desired to prevent the operation of the X-ray source if the collimator is in the swivelled position and a cassette is in the holder. In addition, in certain situations it is desired to enable the collimator to be swivelled 90°. In such conditions, it is desired to detect such 90° swivelling and provide for the exchanging of the longitudinal and cross axes information with regard to the image receptor so that the collimator and the image receptor axes generally conform to each other as in the normal home position. Furthermore, it is desired to prevent premature collimator shutter adjustments in such PBL X-ray apparatus.

SUMMARY OF THE INVENTION

In accordance with the principles of the present invention, there is provided X-ray apparatus in which, with an image receptor or cassette located in a holder or tray, the X-ray source is disabled upon swivelling the collimator having an adjustable shutter aperture angularly from a home position in a plane parallel to the image receptor plane. In particular, there is provided apparatus for detecting plus or minus 10° angular movement of the adjustable shutter aperture from the swivel home position and logic gate means responsive to such swivelled movement for placing the X-ray source or generator in an exposure hold mode, thereby disabling operation of the X-ray source. If the image receptor is removed from the holder, means are provided for selectively enabling operation of the X-ray source.

In accordance with another aspect of the present invention, upon swivelling of the adjustable shutter aperture plus or minus 90° from a non-swivelled home position, the detected cross-sectional dimensions of the image receptor along the longitudinal and cross axes are reversed. This feature is highly desirable since it enables the operator to swivel the collimator either plus or minus 90° from the swivel home position so as to be able to view and access the collimator indicator lights or control knobs on the collimator without placing the operator in a tortuous position.

In still another aspect of the present invention, delay timing means are provided which respond to logic control signals and prevent operation of the collimator shutter drive motors, etc., for a time period of about 100 milliseconds following receipt of the last logic control signal. This insures that all of the logic control signals will have been received prior to actuation of the drive motors and thereby prevents premature collimator shutter adjustments.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings in which like reference numerals identify like elements in the several figures and in which:

DETAILED DESCRIPTION

Figure 1:
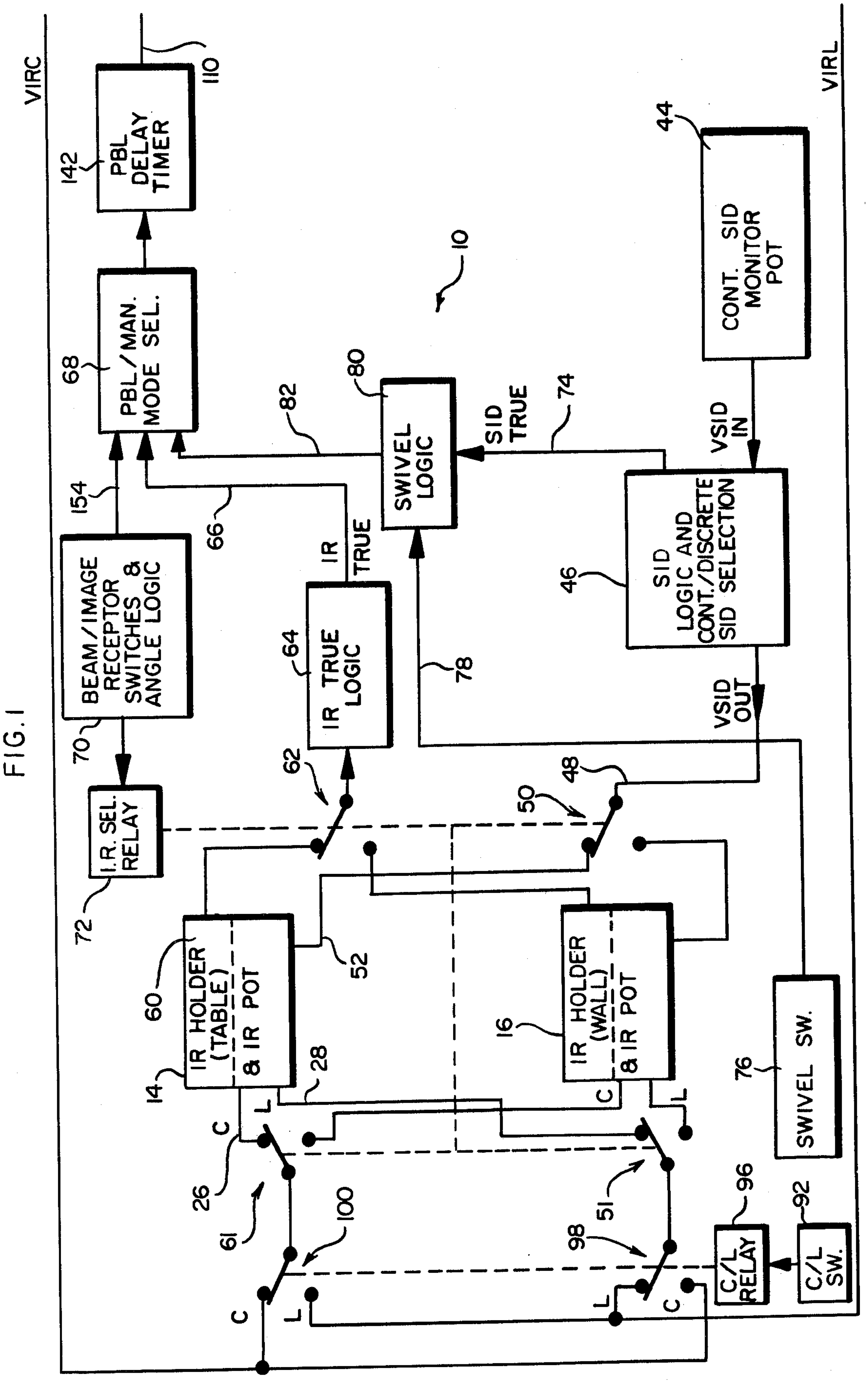
FIG. 1 is a block diagram illustrating the improved PBL X-ray apparatus in accordance with the principles of the present invention.
Figure 1A:
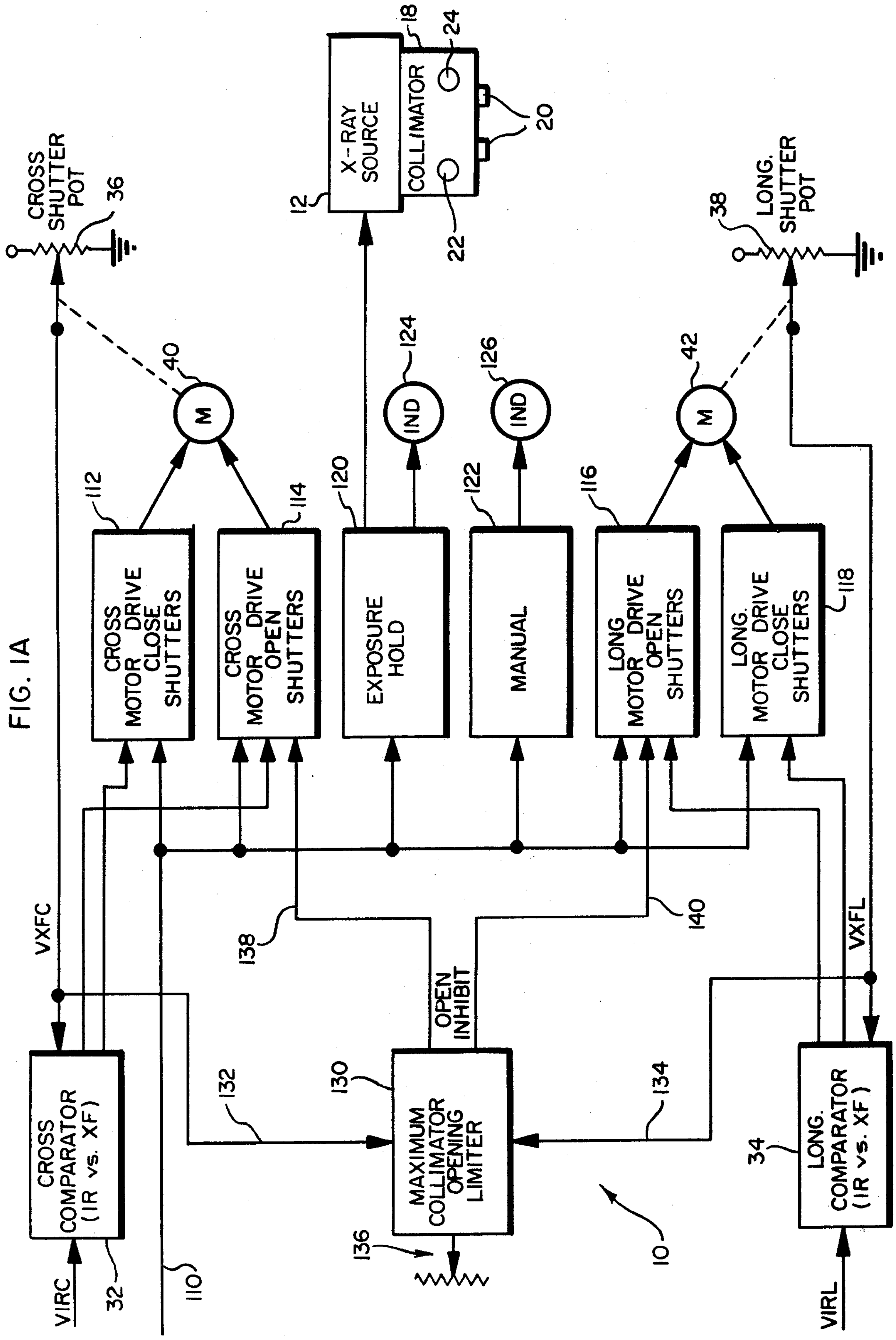

Referring now to the block diagram of FIG. 1, there is illustrated an improved PBL X-ray apparatus 10 which includes an X-ray source 12 for generating a beam of X-rays to a table unit 14 located immediately below the X-ray source or a wall unit 16. The cross sectional dimensions of the X-ray beam are adjusted by a collimator 18 which includes a first pair of shutters (not shown) adjusting the beam along a longitudinal axis and a second pair of shutters 20 for adjusting the beam along a cross axis. In standard practice, the longitudinal axis conforms to the long table dimension and the cross axis to the short table dimension. Collimator 18 includes a knob 22 for manually adjusting the longitudinal shutters and a knob 24 for manually adjusting the cross shutters.

Apparatus 10 further includes apparatus for automatically adjusting the X-ray field size at the image receptor located in table 14 or wall unit 16 to conform to the size of the image receptor or film which has been placed within the table or wall holder. Thus, in accordance with commercial practice and as illustrated for instance in one or more of the aforementioned U.S. patents, the cross-sectional area of the image receptor in terms of its dimensions along the cross axis (C) and along its longitudinal axis (L) are sensed by well-known means with the values being placed on respective output lines 26, 28. The corresponding voltage levels are fed into a cross comparator 32 and a longitudinal comparator 34 for comparison in a known manner with a voltage level representing the X-ray field size in both the cross and longitudinal axes derived from a respective cross collimator shutter pot 36 and a longitudinal collimator shutter pot 38 located within collimator 18.

Respective drive motors 40, 42 adjust the aperture or shutter opening by moving the cross axis shutters 20 and the longitudinal axis shutters (not shown). Motors 40, 42 are also connected to respective potentiometers 36, 38 to derive feedback voltages to respective comparators 32, 34 corresponding to the instantaneous respective shutter positions. Information conforming to the source to image distance (SID) derived from a continuous SID monitor potentiometer 44 and/or in accordance with predetermined discrete SID values is obtained from block 46. The voltage value representing the source to image distance (VSID) on line 48 is coupled through switch 50 and line 52 to be multiplied by the respective values corresponding to the image receptor size on lines 26 and 28.

Therefore, in accordance with standard commercial practice, as required by health and safety regulations, in the PBL X-ray apparatus shown in FIG. 1, the X-ray field size at the image receptor is automatically adjusted in response to the source to image distance and the size of the image receptor located in table 14 or wall unit 16.

In accordance with one aspect of the present invention, there is provided means for detecting swivelling of the collimator having an adjustable shutter aperture in a plane parallel to the image receptor plane and for disabling operation of the X-ray source if an image receptor is located in a holder. With reference to FIG. 1, if we assume an image receptor or cassette has been inserted into holder portion 60 of table 14, this information is transferred as suitable signals through switch 62 and IR True Logic 64 to place an IR True condition on line 66 at the input of PBL/Manual Mode Selector 68. In accordance with known practice, the switches and angle logic in a Beam/Image Receptor unit 70 actuate an IR Select Relay 72 to position switch 62 when a film is in IR holder position 60 of table 14. Also, if X-ray source 12 is located vertically with respect to image receptor holder 60 the well-known SID relationship will be continuously evaluated as the X-ray source is moved vertically to the image receptor to conform the X-ray field size to the image receptor, and an SID True indication is placed on line 74 if the X-ray source remains within the designed range of the continuous SID monitor. If an image receptor is instead placed in wall unit 16, relay 72 operates switches 62, 50 and connected switches 61, 51 and the X-ray source will become enabled when it is pivoted to aim at wall unit 16.

It is to be understood that in accordance with standard commercial practice, if the X-ray source and image receptor are not disposed vertically, the SID relationship is replaced by a discrete value corresponding to predetermined discrete Source-Image Receptor Distances corresponding to industry standard distances of 36, 40, 48 and 72 inches, and an SID True condition signal is placed on line 74 only when X-ray source 12 is positioned at such predetermined discrete distances.

Figure 3:
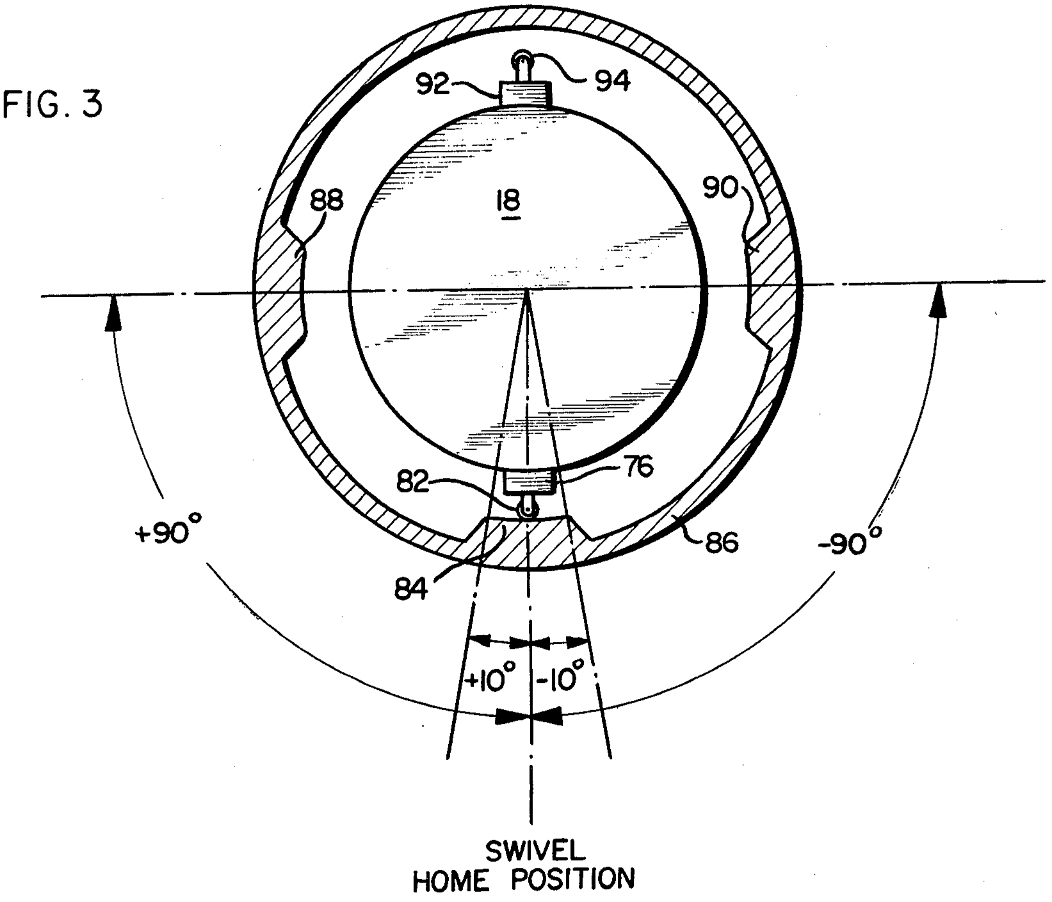
FIG. 3 illustrates a swivel switch detecting angular swivelling of the collimator and a second switch for detecting plus or minus 90° swivelling of the collimator.

Upon swivelling of collimator 18 swivel switch 76 detects such action and provides a corresponding swivel indication on line 78 to Swivel Logic 80 which also receives input line 74 and provides a corresponding signal on input line 82 of PBL/Manual Mode Selector 68. Referring now to FIG. 3, there is illustrated swivel switch 76 including a movable switch plunger 82 mounted to collimator 18. A cam block 84 is rigidly mounted to a frame member 86 so that as the collimator is swivelled or rotated from the illustrated swivel home position, this action is sensed by plunger 82 to actuate switch 76. Collimator swivel movement of about plus or minus 10° from the swivel home position is detected by switch 76 in cooperation with cam 84.

Additional cam blocks 88, 90 are rigidly positioned on frame 86 at respective swivel positions of plus 90° and minus 90° from the swivel home position. A C/L switch 92 with plunger 94 is mounted to collimator 18 so that if the collimator is rotated plus or minus 90° from the swivel home position, switch 92 detects such 90° movement. Referring to FIG. 1, it can be seen that C/L switch 92 operates relay 96 to actuate associated switches 98, 100 and thereby exchange the cross and longitudinal positions. Therefore, C/L switch 92 detects collimator swivel movement of plus or minus 90° from the home position and acting through the illustrated relay and switches reverses the detected cross-sectional dimensions of the image receptor represented by the detected values along the cross and longitudinal axes. This enables the operator to swivel the collimator if desired to either the plus or minus 90° position with respect to the home position and thereby obtain a more convenient access to the collimator manual controls or to viewing of the control indicators on the collimator itself. It is to be understood of course that rather than mounting cams 84, 88 and 90 to a single frame member as shown in FIG. 3, they may be individually mounted to separate frame members as desired.

Figure 2:
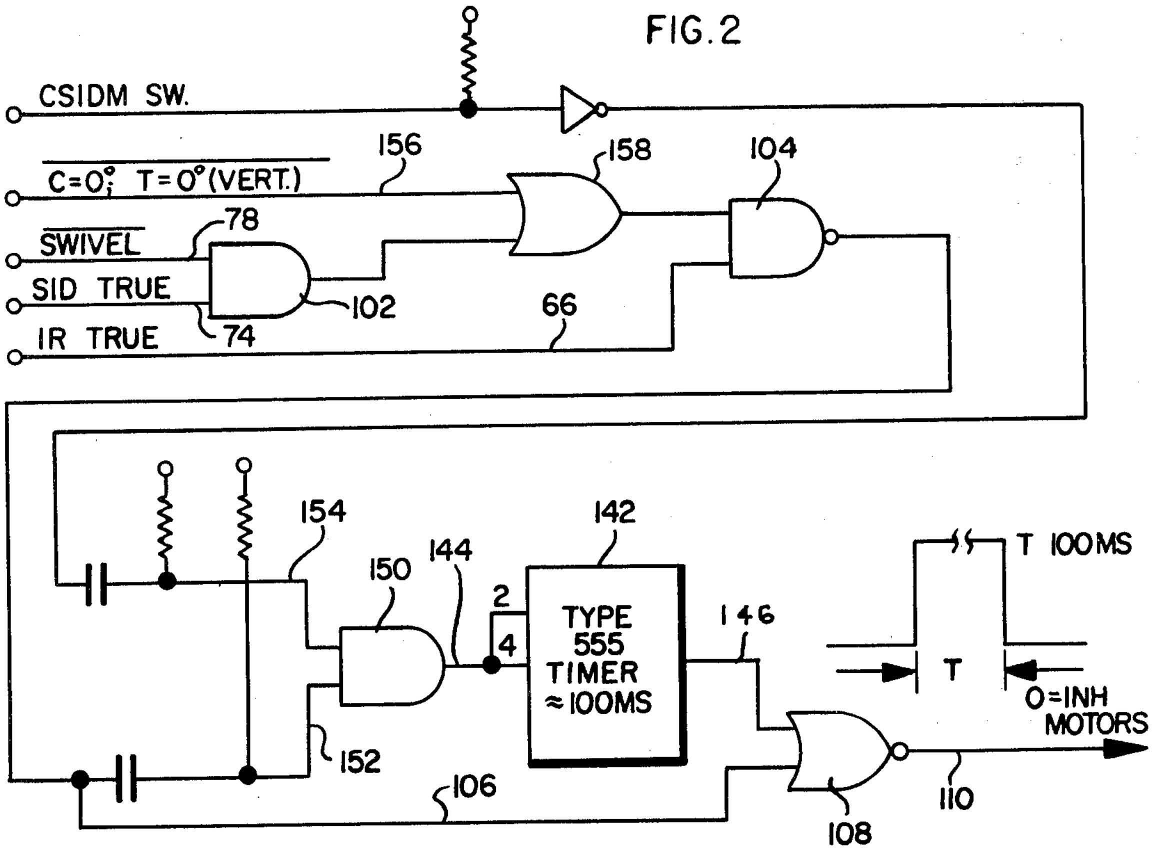
FIG. 2 is a schematic illustration of a logic control circuit providing collimator swivel control and a time delay.

In the logic block diagram of FIG. 2, line 74 is indicated as providing an SID True condition input to And gate 102. Line 78 provides for example an appropriate indication that the collimator is at the swivel home position. Also, if a cassette or image receptor is located within holder 60, an IR True condition is present on line 66 at one of the inputs to Nand gate 104. The output of Nand gate 104 is coupled on line 106 to Nor gate 108, with the output line 110 of gate 108 being coupled as shown in FIG. 1 to respective motor drive circuits 112, 114, 116, 118, as well as to an exposure hold circuit 120 and manual operation circuit 122. It is to be understood that the motor drive circuits 112, 114, 116 and 118 are well-known logic cricuits enabled by a logic high on line 110 to drive corresponding shutter motors 40, 42 and thereby either open or close the cross axis and longitudinal axis shutters. When enabled, motor drive circuits 112, 114, 116 and 118 respond to drive corresponding shutter motors 42, 44 in the direction indicated upon receipt of the appropriate logic level signal from corresponding comparators 32, 34. At most one of each motor drive circuit pair will be commanded ON at a given time. Either or both of comparators 32, 34 may determine that no shutter motion is required and will then command both corresponding motor drive circuits OFF.

Similarly, exposure hold circuit 120 responds to a suitable condition on line 110 and is coupled to standard X-ray generating circuits to either enable actuation of X-ray source 12 or to disable operation of the X-ray source. Indicator lights 124, 126 are provided to display the respective conditions to the operator. Means are also provided such as limiter 130 for receiving respective information on lines 132 and 134, for comparing said information with values representing the maximum collimator shutter openings in the cross and longitudinal directions as set in adjustable potentiometer 136 to place an Open Inhibit condition on lines 138, 140 in the event the collimator shutters are attempted to be opened beyond the maximum opening set in adjustment 136.

Thus, in accordance with one aspect of the present invention, if the collimator has been swivelled from the home position, and an image receptor is present in its table or wall holder, PBL operation is blocked in that the X-ray source is in an Exposure Hold condition and operation of the collimator shutter motors is Inhibited. However, if the image receptor is removed from its holder, manual operation is permitted, as desired.

Referring to FIG. 2, timer 142 provides a predetermined delay time to insure that all of the PBL/Manual Mode Select signals have been received, thereby preventing any possible premature actuation of the shutter motors which does not truly correspond to an actual desired system condition. Accordingly, a high to low transition on timer input line 144 sets timer 142. Timer 142 correspondingly provides a time delay of 100 milliseconds after receiving the last logic control pulse on input line 144. After the 100 millisecond time delay, a high to low transition is provided on output line 146 which in turn is coupled to Nor gate 108. Thus, during changes in the logic inputs of FIG. 2 and for 100 milliseconds after the last such change, line 110 is in a low or Zero state to inhibit the operation of collimator shutter motors 40 and 42. The actual time delay may of course be set for any time period desired.

And gate 150 on its input line 152 receives logic control information as to whether an image receptor has been placed in a holder (IR True), whether the collimator is at a predetermined, discrete SID or within continuous SID range (SID True), and whether the collimator has been swivelled ($\overline{\text{Swivel}}$). A series of pulses appearing on input line 154 from a continuous SID monitor switch (CSIDM sw) provides an indication that the X-ray source 12 is being moved vertically from one position to another position. Line 156 into Nor gate 158 is used to monitor whether the collimator and the table are in a vertical position, that is, not tilted more than about 10° from a vertical condition.

The foregoing detailed description has been given for clearness of understanding only, and no unnecessary limitations should be understood therefrom, as modifications will be obvious to those skilled in the art. The invention is not to be taken as limited to all of the details thereof as modifications and variations thereof may be made without departing from the spirit or scope of the invention.

What is claimed is:

1. In X-ray apparatus, including a source of X-rays, an image receptor locatable in a holder, a collimator having an adjustable shutter aperture, means for adjusting the shutter aperture in response to detected distances between the X-ray source and the image receptor to form a corresponding X-ray field size at a plane containing the image receptor, and means for positionally swivelling said adjustable shutter aperture angularly from a home position in a plane parallel to the image receptor plane, the improvement comprising means for:

i. disabling operation of said X-ray source during swivelling said adjustable shutter aperture from the home position while said image receptor is located in said holder, and ii. enabling operation of said X-ray source during swivelling said adjustable shutter aperture from the home position while said image receptor is absent from said holder.

2. Apparatus according to claim 1, wherein said disable means includes detection means for detecting swivelling of said adjustable shutter aperture from the home position.

3. Apparatus according to claim 2, wherein said detection means includes logic gate means responsive to swivelling for disabling operation of said X-ray source.

4. Apparatus according to claim 2, wherein said detection means detects swivelling of about plus or minus 10° angularly from said home position.

5. Apparatus according to claim 1, including means responsive to removal of said image receptor from said holder for selectively disabling operation of said X-ray source if said X-ray source is not at a detected predetermined discrete distance from said image receptor.

6. Apparatus according to claim 5, including means responsive to removal of said image receptor from said holder for selectively enabling operation of said X-ray source if said collimator is in the swivelled position and said X-ray source is at a detected predetermined discrete distance from said image receptor.

7. In X-ray apparatus, including a source of X-rays, an image receptor, an adjustable shutter aperture, means for adjusting the shutter aperture in response to detected distances between the X-ray source and the image receptor and in conformance with detected cross-sectional dimensions of the image receptor to form a corresponding X-ray field size at a plane containing the image receptor, and means for positionally swivelling said adjustable shutter aperture angularly from a home position in a plane parallel to the image receptor plane, the improvement comprising means responsive to positionally swivelling said adjustable shutter aperture plus or minus 90 degrees from said home position to reverse the detected cross-sectional dimensions of the image receptor.

8. In an x-ray apparatus, including a source of x-rays, an image receptor, an adjustable shutter aperture, means for adjusting the shutter aperture in response to detected distances between the x-ray source and the image receptor and in conformance with detected cross-sectional dimensions of the image receptor and operative to form a corresponding x-ray field size at a plane containing the image receptor, and means providing a group of logic control signals indicative of the relative positioning of said source of x-rays with respect to said image receptor, the improvement comprising time delay means responsive to a change in said logic control signals and operative to inhibit automatic adjustment of said shutter aperture for a predetermined time period subsequent to said change in the logic control signals.

9. Apparatus according to claim 8, wherein said time delay means includes means responsive to said respective logic control signals for inhibiting automatic adjustment of said shutter aperture for a predetermined time period commencing with the last change in said logic control signals in said group coupled to said time delay means.

10. Apparatus according to claim 9, wherein said predetermined time period is about 100 milliseconds.

* * * * *